United States Patent [19]
Farrington et al.

[11] Patent Number: 5,906,426
[45] Date of Patent: May 25, 1999

[54] LIGHT WITH FLEXIBLE SUPPORT AND REDUCED STORAGE LENGTH

[75] Inventors: Richard I Farrington, Seymour; Richard J. Carbone, Southbury, both of Conn.

[73] Assignee: Black & Decker Inc., Newark, Del.

[21] Appl. No.: 08/892,468

[22] Filed: Jul. 14, 1997

[51] Int. Cl.$^6$ .................................................. F21L 7/00
[52] U.S. Cl. .................... 362/198; 362/197; 362/418; 362/419
[58] Field of Search ....................... 362/197, 198, 362/390, 418, 419, 427; 439/350, 352, 162

[56] References Cited

U.S. PATENT DOCUMENTS

| | | |
|---|---|---|
| D. 366,948 | 2/1996 | Carbone . |
| D. 371,856 | 7/1996 | Carbone . |
| D. 372,548 | 8/1996 | Carbone . |
| D. 374,299 | 10/1996 | Carbone . |
| 5,369,556 | 11/1994 | Zeller ........................................ 362/198 |
| 5,517,392 | 5/1996 | Rousso ..................................... 362/198 |
| 5,521,803 | 5/1996 | Eckert et al. . |
| 5,567,115 | 10/1996 | Carbone . |
| 5,749,644 | 5/1998 | Carbone .................................. 362/198 |

*Primary Examiner*—Sandra O'Shea
*Assistant Examiner*—Marshall Honeyman
*Attorney, Agent, or Firm*—Barry E. Deutsch; Kerry H. Owens

[57] ABSTRACT

An electrically powered appliance includes a first housing connected to a source of electric power. A second housing is spaced from the first housing and includes means for using the electric power. In a preferred embodiment, the electricity powers a light source. A flexible mounting assembly connects the first and second housings. One of the first and second housings includes an elongated slot and the other of the housings includes a protrusion for engagement with the slot. The first housing includes an axially extending U-shaped channel. A portion of the flexible mounting assembly adjacent said second housing is supported within said U-shaped channel when the first and second housings are adjacent each other.

9 Claims, 5 Drawing Sheets

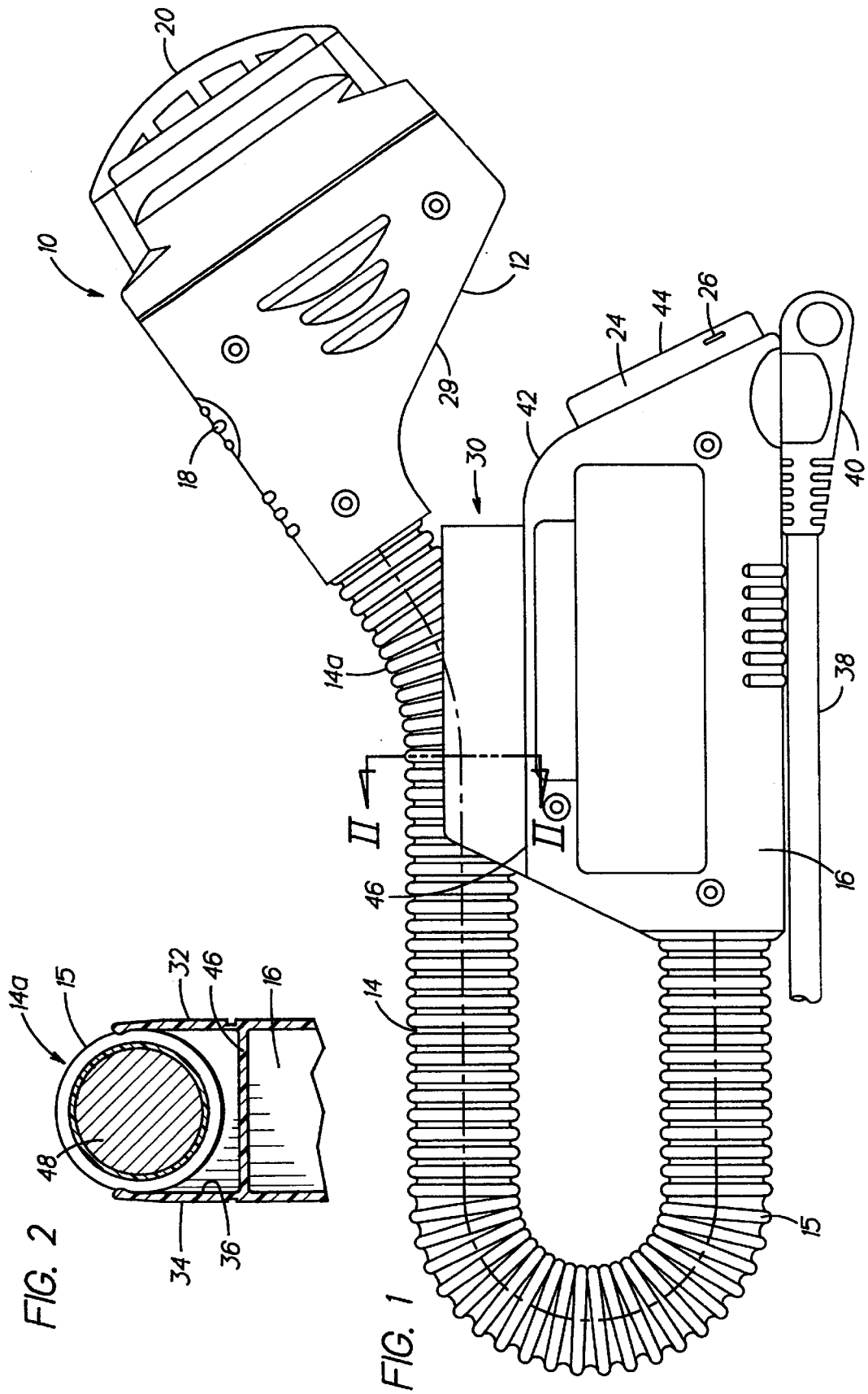

LIGHT WITH FLEXIBLE SUPPORT AND REDUCED STORAGE LENGTH

BACKGROUND OF THE INVENTION

This invention relates to electrically operated appliances and in particular to appliances having a working end, a power end and a flexible portion connecting the working and power ends. This invention more specifically relates to means for connecting the power end to the working end of the appliance for compact storage thereof.

Flexible flashlights such as shown in U.S. Pat. Nos. 5,517,392, 5,521,803 and 5,567,115 have achieved enormous commercial success. The flashlights disclosed in the cited patents, include a working end or head housing, a power end or tail housing, and a flexible assembly connecting the working end and power end housings. A similar product which was marketed by an affiliate of the assignee of the present application comprised a battery operated individual, portable fan. In lieu of a bulb, light and reflector in the working end housing of a flashlight, the fan included a grille and fan assembly in the working end housing. Another appliance utilizing a flexible intermediate assembly is an A.C. powered work light. A.C. powered work lights are used in performing maintenance tasks and the like.

All the flashlights, individual fans, and A.C. powered lights including a flexible intermediate portion, are longer than standard length comparable units. Thus, particularly for shipping or storage purposes, it is desirable that the head end and tail end housings may be joined together with the flexible, intermediate portion forming a generally U-shape. When the intermediate portion is bent into the U-shaped configuration, the overall length of the apparatus may be 50 to 65% of the total length of the device when the intermediate portion is in an unbent state. By reducing the total length between 35 to 50%, shipping and storage of the device is made significantly more convenient.

It is accordingly an object of the invention to positively connect the head end and tail end housings of an appliance having a flexible intermediate portion so that the total length of the appliance can be reduced for shipping and storage purposes.

SUMMARY OF THE INVENTION

The foregoing object and other objects of the invention are attained in an appliance comprising a first housing connected to a source of electric power. The appliance includes a second housing spaced from the first housing. A flexible mounting assembly electrically connects the first and second housings. One of the first and second housings includes an elongated slot and the other of the housings includes a protrusion for engagement with the slot. The first housing includes an axially extending U-shaped channel. A portion of the flexible mounting assembly adjacent the second housing is supported within the U-shaped channel when the first and second housings are positioned adjacent each other.

BRIEF DESCRIPTION OF THE DRAWING

FIG. 1 is a side elevational view of an appliance embodying the present invention, with the power end housing separated from the working end housing;

FIG. 2 is a sectional view taken along line II—II of FIG. 1;

DESCRIPTION OF THE PREFERRED EMBODIMENT

Figure 3:
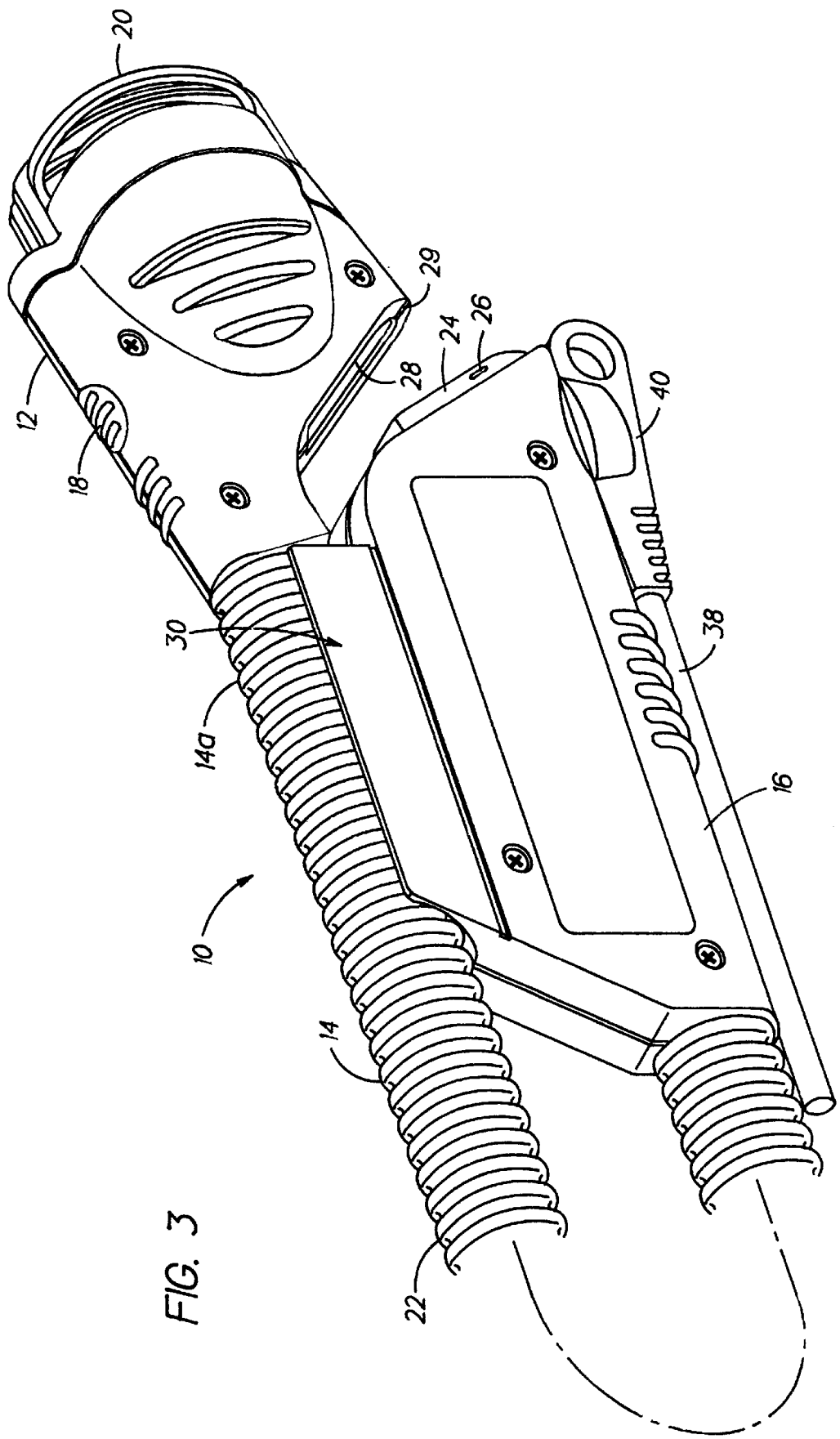
FIG. 3 is a perspective view, taken from the rear, top and right side of the appliance illustrated in FIG. 1.
Figure 4:
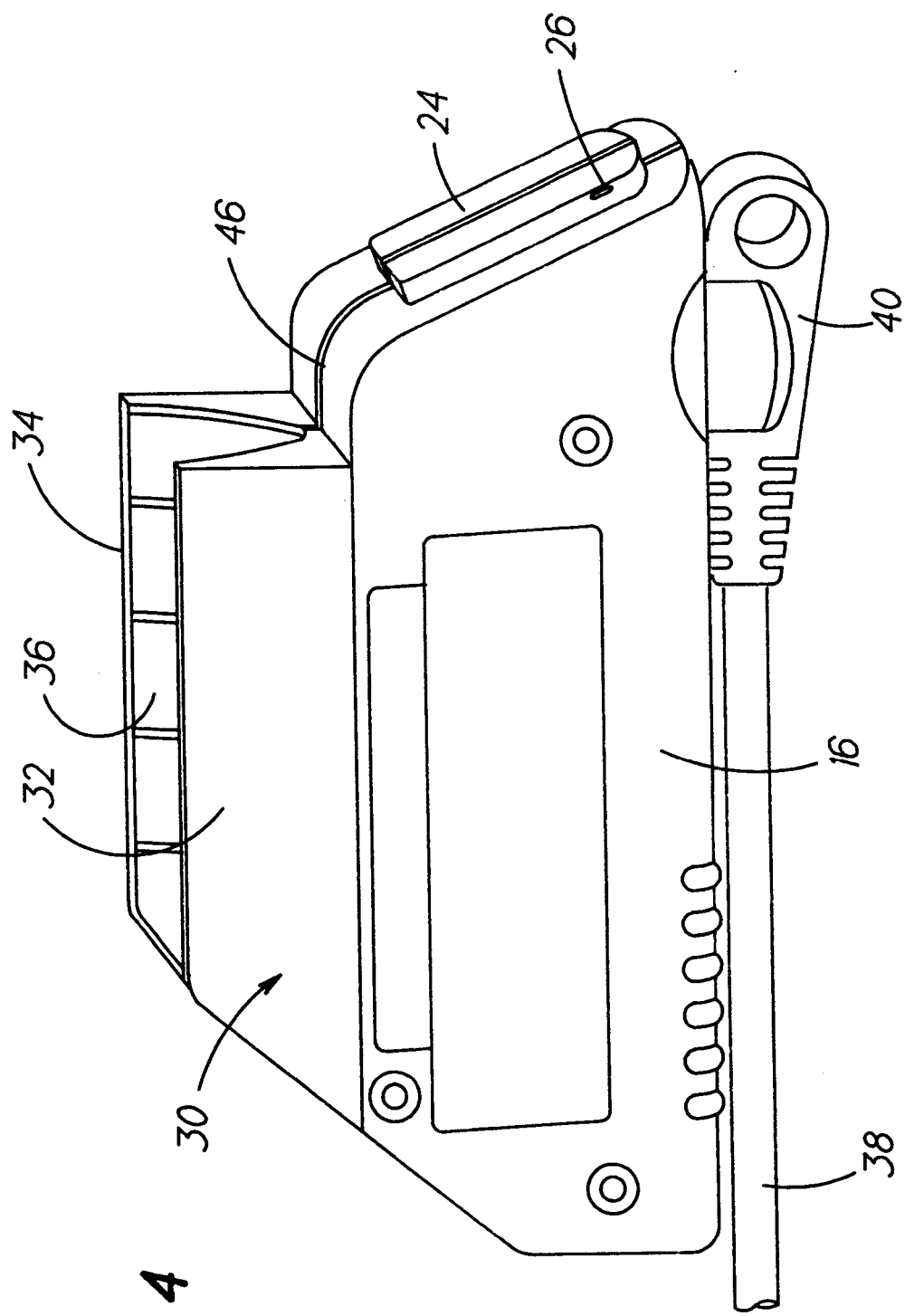
FIG. 4 is a perspective view of the power end housing of the appliance illustrated in FIG. 1.
Figure 5:
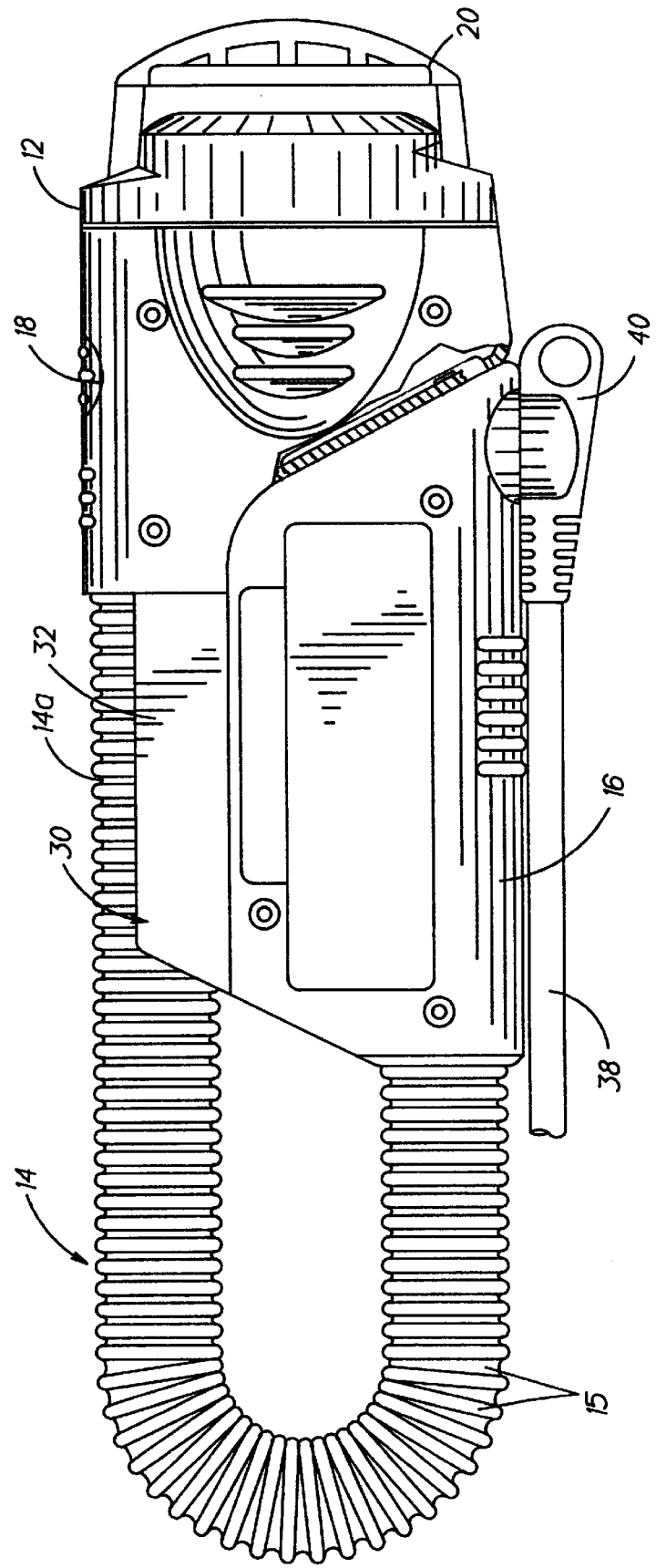
FIG. 5 is a side elevational view of the appliance with the working end housing engaged with the power end housing.
Figure 7:
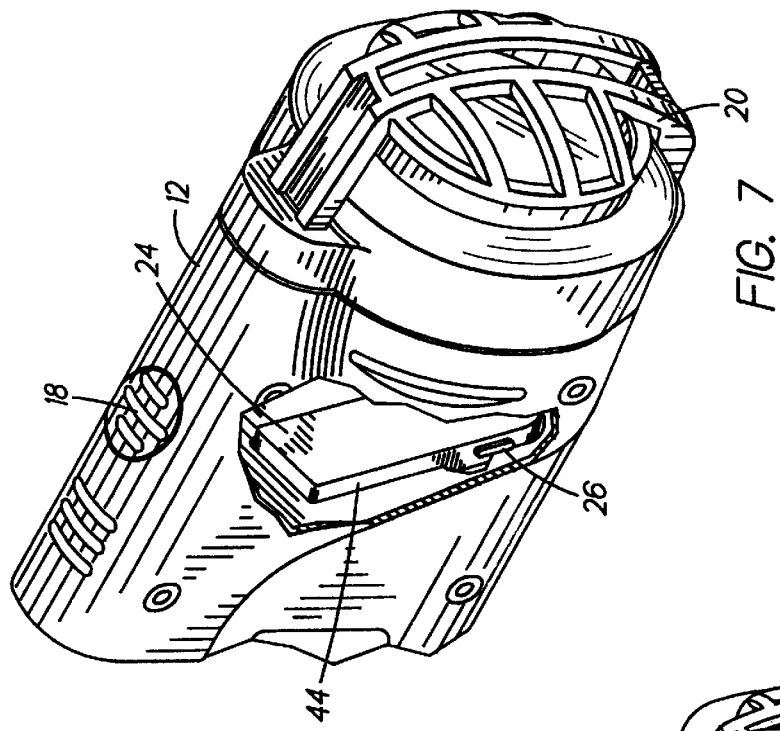
FIG. 7 is an enlarged, perspective view of the working end housing with the portion identified as 7.7 in FIG. 6 broken away to show details of the appliance.
Figure 6:
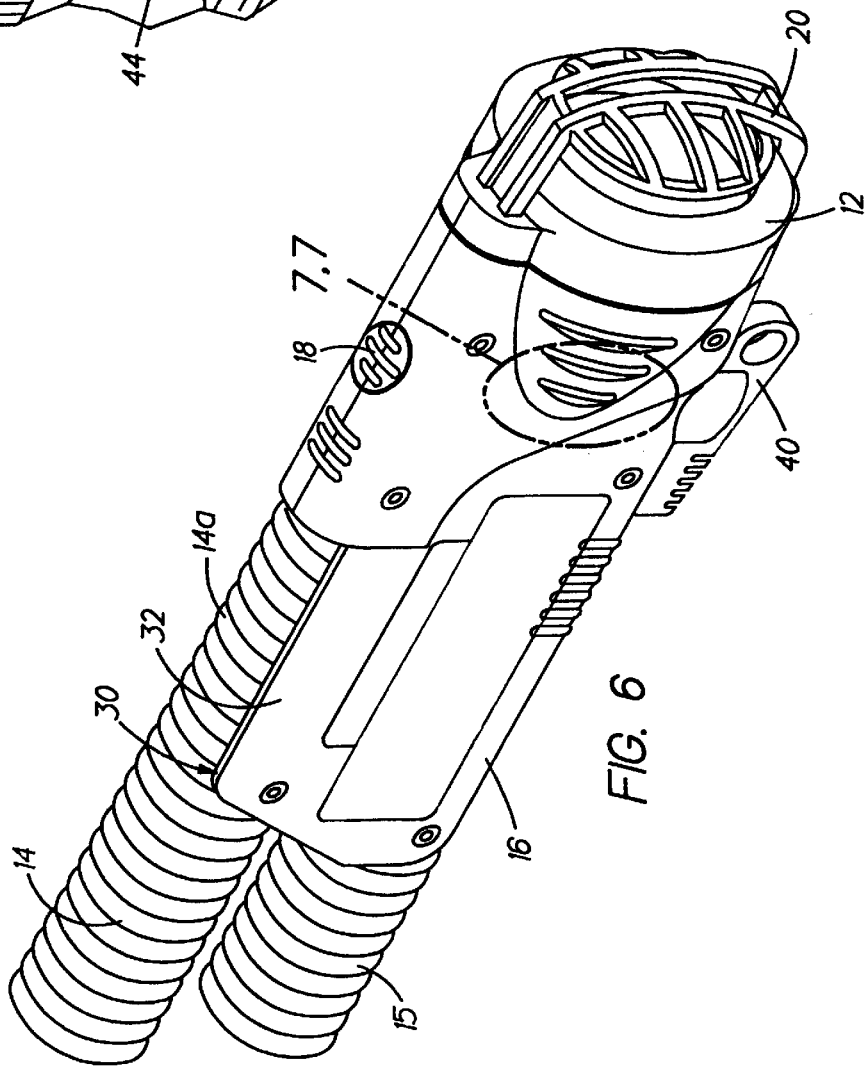
FIG. 6 is a perspective view primarily of the working end housing, taken from the front, top and right side thereof.

Referring now to the various figures of the drawing, there is disclosed a preferred embodiment of the present invention. In referring to the various figures of the drawing, like numerals shall refer to like parts.

The present invention is embodied in an A.C. powered utility light 10. The invention may also be used with flashlights, fans, or other similar devices which include a power end or tail housing, a working end or head housing, and a flexible assembly connecting the working end and tail end housings.

Utility light 10 includes a working end housing 12 and a tail end housing 16. A flexible assembly 14 connects the working end and tail end housings. Flexible assembly 14 enables working end housing 12 to be moved independently of tail end housing 16.

Working end housing 12 includes a 12 volt halogen bulb with an integral reflector and a cover glass overlying the bulb reflector assembly. An on-off switch 18 is provided in housing 12 to enable the user to selectively actuate the light. Since the light is used for utilitarian purposes such as maintenance tasks, a grille 20 is placed over the front of the housing to protect the cover glass and bulb.

Housing 16 is connected to a source of A.C. electrical power via power cord 38 through strain relief 40. The details of power cord 38 and strain relief 40 are more fully disclosed in co-pending application Ser. No. 08/873,832, filing date Jun. 12, 1997, filed in the names of Richard I. Farrington and Anthony Brooks Rorke. Housing 16 includes a somewhat sloped rear surface 42. Surface 42 includes an elongated protrusion 24. Protrusion 24 includes a detent or projection 26 on at least one of its upstanding surfaces 44. Tail housing 16 further includes a channel member 30 extending from the top surface 46 of the housing.

Housing 12 includes a slot 28 formed in surface 29. The slope of surfaces 29 and 42 are complementary and the vertical length of protrusion 24 is generally co-extensive with the vertical length of slot 28.

Channel member 30 includes spaced vertical walls 32, 34 which define a generally U-shaped channel 36 therebetween. The purpose of channel member 30, protrusion 24 with detent 26, and slot 28 shall be more fully described hereinafter.

Flexible assembly 14 includes a first section 14a disposed substantially adjacent housing 12. Flexible assembly 14 comprises an outer elastomeric sleeve 15 which surrounds a plurality of universally rotatable or pivotable members 48. Details of the flexible assembly are more fully described in U.S. Pat. Nos. 5,521,803 and 5,567,115.

Light 10 is longer than most other utility lights due to the incorporation of flexible assembly 14. For storage, shipping and display purposes, it is desirable that the light be capable of being bent and maintained in the bent position to reduce the overall length of the light. To achieve the compact configuration for light 10, flexible assembly 14 is bent into a U-shaped configuration so that tail housing 16 is positioned substantially adjacent head housing 12. To maintain the housings in such position and flexible assembly 14 in its U-shaped bent state, protrusion 24 is inserted within slot 28 of head housing 12. Detent 26 fits under the lip of the housing portion defining slot 28 to assist in maintaining protrusion 24 within slot 28. Forward portion 14a of flexible assembly 14 is disposed within the U-shaped channel 36 formed by walls 32, 34 of channel member 30. The combination of channel member 30, protrusion 24 and slot 28 result in the head and tail housings 12, 14 being joined together. By joining the two housings together, the overall length of light 10 will be reduced between 50 to 65% of its total unbent length. By reducing the total length of the light, the light can be more conveniently stored, shipped, or displayed.

While a preferred embodiment of the present invention has been described and illustrated, the invention should not be limited thereto, but may be otherwise embodied within the scope of the following claims.

What is claimed is:

1. An appliance comprising:
   a first housing connected to a source of electric power;
   a second housing spaced from said first housing including means for using said electric power;
   a flexible mounting assembly connecting said first housing to said second housing;
   said first housing having a rear sloped surface and said second housing having a mating sloped surface, the angles of the rear sloped surface and the mating sloped surface being substantially identical;
   one of said rear and mating sloped surfaces including an elongated slot and the other of said rear and mating sloped surfaces including a protrusion for engagement with said slot; and
   said first housing including an axially extending substantially linear U-shaped channel on a substantially linear surface intersecting with the rear sloped surface, a portion of said flexible mounting assembly adjacent said second housing being supported within said U-shaped channel when said rear sloped surface of said first housing and said mating sloped surface of said second housing are positioned adjacent each other and said protrusion is in engagement with said slot.

2. An appliance in accordance with claim 1 wherein said appliance is an A.C. powered light.

3. An appliance in accordance with claim 2 wherein said power using means includes a light bulb, reflector, and lens.

4. An appliance in accordance with claim 3 wherein said second housing includes said slot formed therein.

5. An appliance in accordance with claim 4 wherein first housing includes said protrusion formed therein.

6. An appliance in accordance with claim 1 wherein said second housing includes said slot formed therein.

7. An appliance in accordance with claim 6 wherein said first housing includes said protrusion formed therein.

8. An appliance comprising:
   a first housing connected to a source of electric power;
   a second housing spaced from said first housing including means for using said electric power;
   a flexible mounting assembly connecting the first housing to the second housing;
   a channel having an originating edge and a terminating edge located along a first surface of the first housing, said flexible mounting assembly being positionable in the channel such that a juncture of the flexible mounting assembly and the second housing is positioned adjacent the terminating edge of the channel and said second housing extends beyond the U-shaped channel when the appliance is in the compressed position;
   a housing attachment mechanism for releasably attaching the first housing to the second housing, having a mating segment on a second surface of the first housing and a matching mating segment on the second housing to facilitate attachment of the first housing to the second housing.

9. An appliance comprising:
   a substantially polygonal first housing connected to a source of electric power;
   a second housing spaced from said first housing including means for using said electric power;
   a flexible mounting assembly connecting the first housing to the second housing;
   a channel located only along a substantially linear first surface of the first housing, said flexible mounting assembly being positionable in the channel;
   a housing attachment mechanism for releasably connecting the first housing to the second housing when the appliance is in a compressed position, the attachment mechanism located on a substantially linear second surface of the first housing, said second surface positioned at an angle with respect to the first surface.

* * * * *